US012631224B2

(12) United States Patent
Goebel et al.

(10) Patent No.: US 12,631,224 B2
(45) Date of Patent: May 19, 2026

(54) FREEWHEEL HUB FOR A BICYCLE

(71) Applicant: SRAM DEUTSCHLAND GmbH, Schweinfurt (DE)

(72) Inventors: Joachim Goebel, Prosselsheim (DE); Martin Kehrer, Bad Neustadt (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 18/748,468

(22) Filed: Jun. 20, 2024

(65) Prior Publication Data
US 2025/0010658 A1 Jan. 9, 2025

(30) Foreign Application Priority Data
Jul. 6, 2023 (DE) ..................... 10 2023 117 915.2

(51) Int. Cl.
*F16D 41/30* (2006.01)
*B60B 27/02* (2006.01)
*B60B 27/04* (2006.01)

(52) U.S. Cl.
CPC ............ *F16D 41/30* (2013.01); *B60B 27/023* (2013.01); *B60B 27/047* (2013.01)

(58) Field of Classification Search
CPC ................. B60B 27/023; B60B 27/047; F16D 2041/0605; F16D 2041/0603; F16D 41/30; F16D 41/12; F16D 41/20
See application file for complete search history.

(56) References Cited

U.S. PATENT DOCUMENTS

| | | | | |
|---|---|---|---|---|
| 2,226,247 A | * | 12/1940 | Lesage | .................... F16D 41/30 192/64 |
| 6,814,201 B2 | | 11/2004 | Thomas | |
| 2002/0014384 A1 | * | 2/2002 | Kroger | .................... F16D 41/30 192/64 |
| 2017/0175861 A1 | | 6/2017 | Emam | |

FOREIGN PATENT DOCUMENTS

| | | | | |
|---|---|---|---|---|
| EP | 1108914 | 6/2001 | | |
| EP | 1108914 B1 | * | 3/2005 | ............. F16D 41/12 |
| EP | 3984764 | 4/2022 | | |
| WO | WO-2023106618 A1 | * | 6/2023 | ............. F16D 41/12 |

* cited by examiner

*Primary Examiner* — Lori Wu

(57) ABSTRACT

A freewheel hub for a bicycle includes a driver and a hub sleeve, which are each supported on a hub axle to be rotatable about a common axis of rotation, a detent body arrangement having at least one detent body, supported in a radial detent body recess to be displaceable between a locking position and a release position, and a preloading device, which is configured to preload the detent body towards the locking position, wherein the detent body recess is provided in a component comprising the driver and the hub sleeve, while the other has a radial driving tooth system or is connected for conjoint rotation to the latter, wherein the surface of the detent body has a coupling surface, which rests against a contact surface of the detent body recess in the locking position, while an engagement portion of the detent body engages in the driving tooth system.

12 Claims, 9 Drawing Sheets

<u>Fig. 13</u>
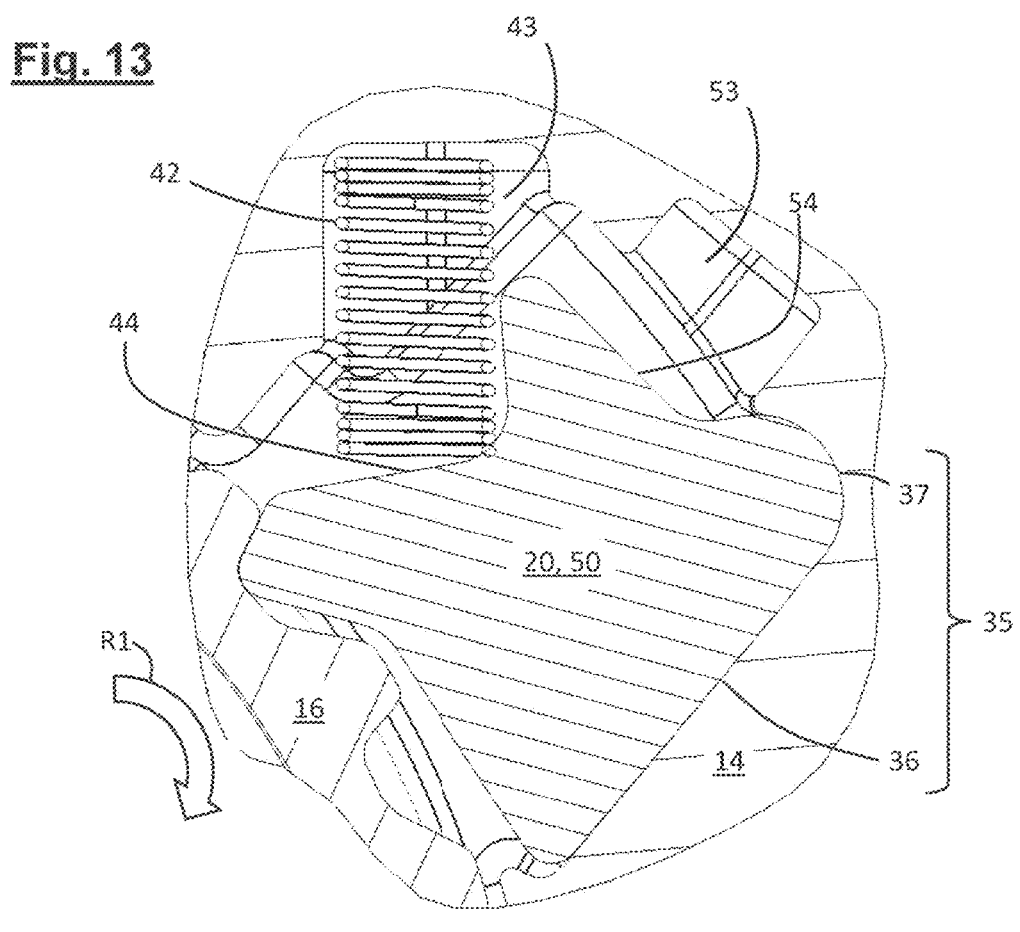
<u>Fig. 14</u>
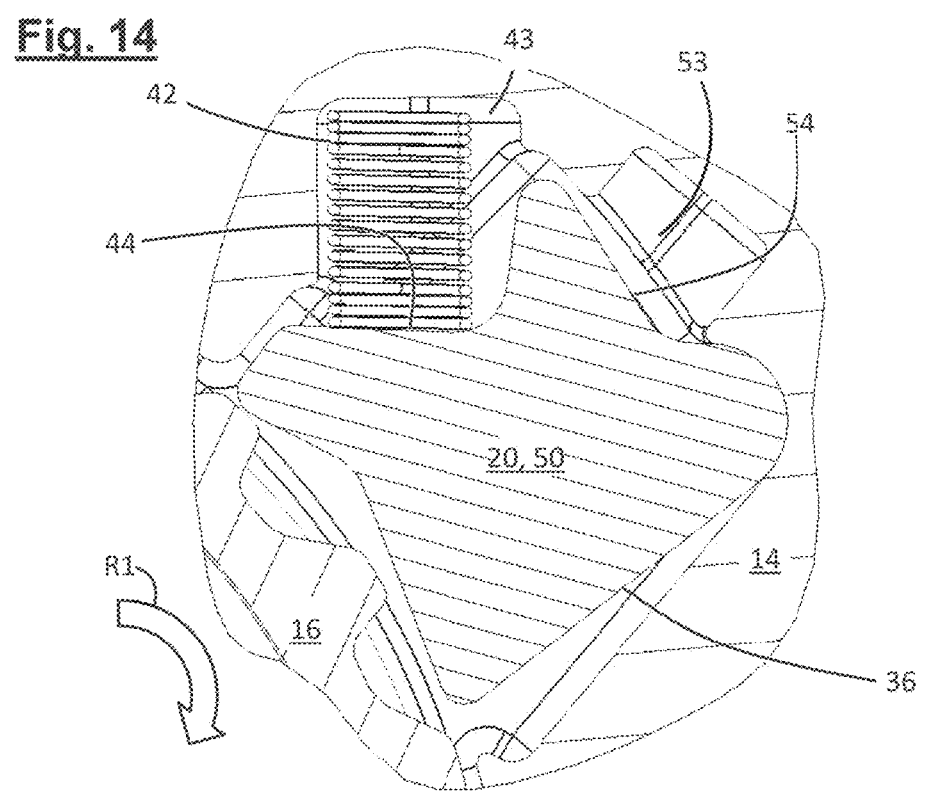

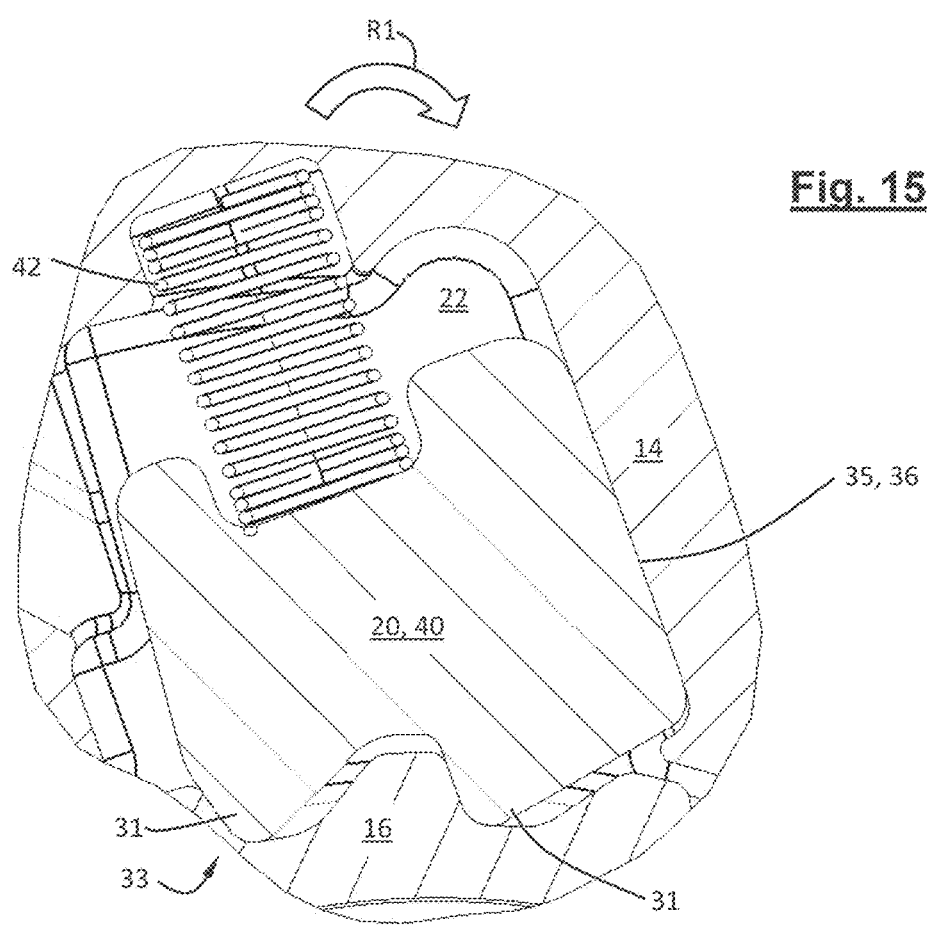
_Fig. 15_
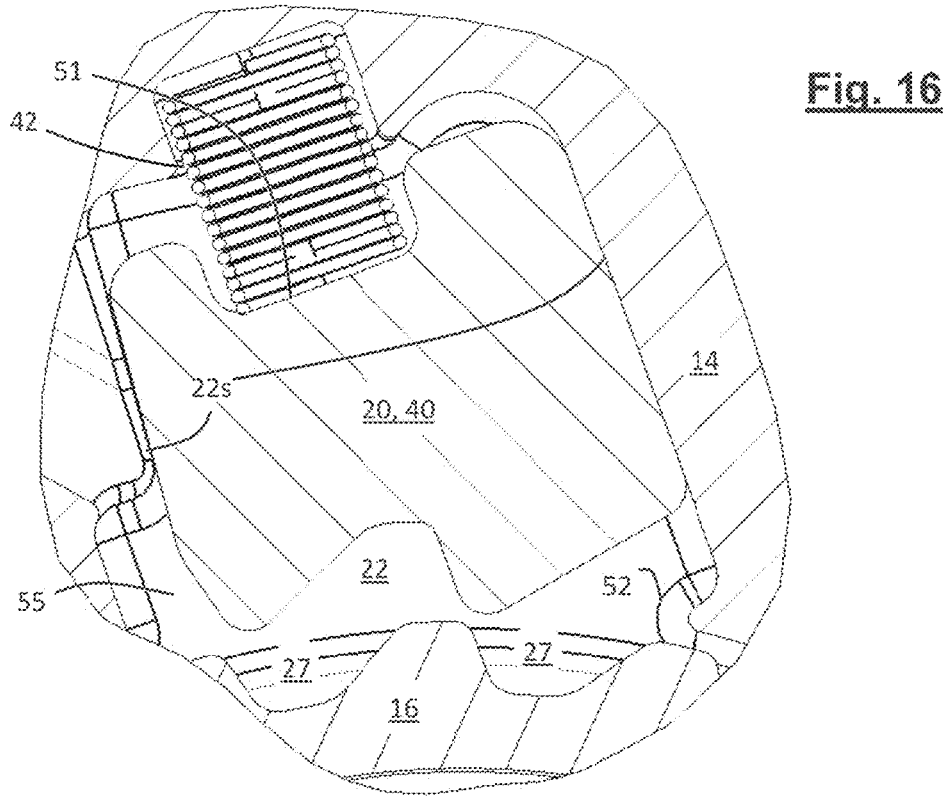
_Fig. 16_

FREEWHEEL HUB FOR A BICYCLE

This application claims priority to German Patent Application No. 10 2023 117 915.2, filed Jul. 6, 2023, which is hereby incorporated by reference in its entirety.

BACKGROUND

A freewheel hub is known from document DE 4025708 A1, for example. In this case, the detent bodies are each rotationally displaceable detent pawls with a relatively small cylindrical coupling surface.

One disadvantage of such pawls that move in rotation is that either they can transmit relatively low forces or have to be made larger since the force vector of such pawls has a large radial component, which the receiving housing components must support.

In contrast, axial freewheels, in which the torque is transmitted from the driver to the hub sleeve via axial tooth systems can admittedly transmit large forces with small dimensions but are expensive to produce. A bicycle hub with an axial freewheel, also referred to as a toothed disc freewheel, is described in EP 3984764 A1, for example.

SUMMARY

One aspect of the invention includes a freewheel hub for a bicycle, including a driver and a hub sleeve, which are each supported on a hub axle in such a way as to be rotatable about a common axis of rotation, a detent body arrangement comprising at least one detent body, which is supported in a radial detent body recess in such a way as to be displaceable between a locking position and a release position, and a preloading device, which is configured to preload the detent body towards the locking position. Where the detent body recess is provided in a component comprising the driver and the hub sleeve, while the other component comprising the driver and the hub sleeve has a radial driving tooth system or is connected for conjoint rotation to the driving tooth system. Where the surface of the detent body has a coupling surface, which rests against a contact surface of the detent body recess in the locking position, while an engagement portion of the detent body engages in the driving tooth system, such that, when the driver rotates in a first direction of rotation about the axis of rotation, torque is transmitted from the driver to the hub sleeve via the coupling surface, and wherein, in the release position, the detent body allows rotation of the hub sleeve relative to the driver in the first direction of rotation. Where more than half of the coupling surface is designed as a planar region.

BRIEF DESCRIPTION OF DRAWINGS

FIG. 13 shows a second exemplary embodiment of a freewheel hub according to the invention with a slightly modified shape and spring support of the detent pawls;

FIG. 14 shows a second exemplary embodiment of a freewheel hub according to the invention with a slightly modified shape and spring support of the detent pawls;

FIG. 15 shows a third exemplary embodiment of a freewheel hub according to the invention having detent bodies designed as detent slides, FIG. 16 shows a third exemplary embodiment of a freewheel hub according to the invention having detent bodies designed as detent slides.

Other aspects and advantages of the embodiments disclosed herein will become apparent upon consideration of the following detailed description, wherein similar or identical structures have similar reference numerals.

DETAILED DESCRIPTION

Figure 1:
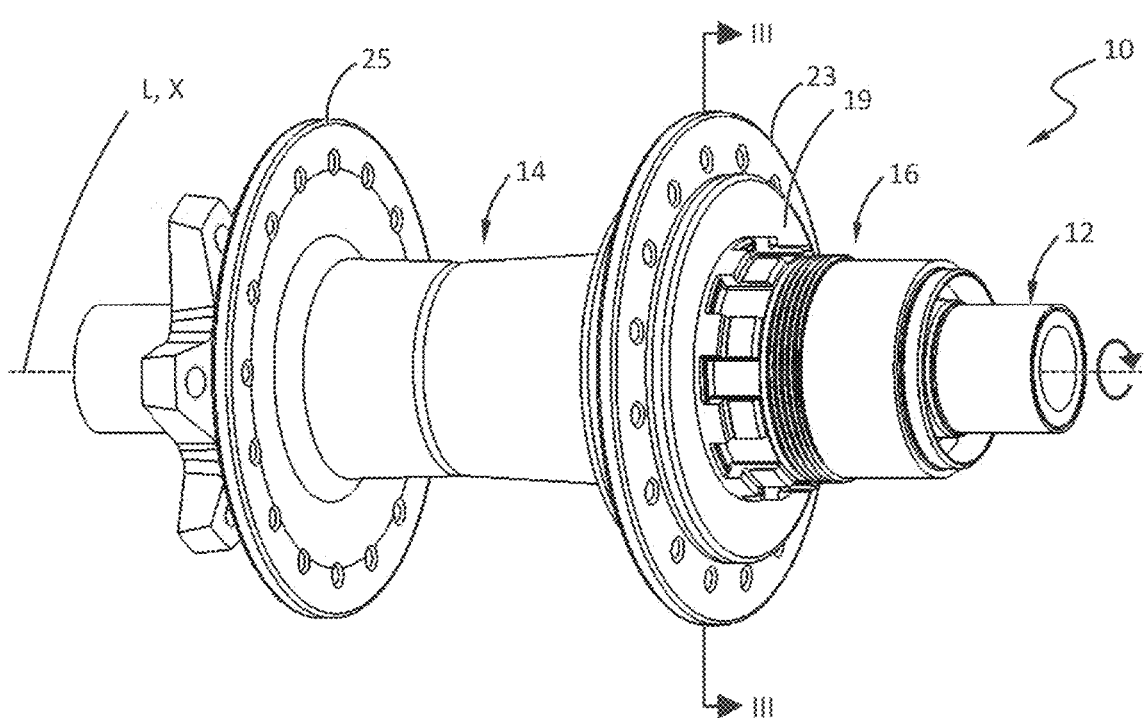
FIG. 1 is a first exemplary embodiment of a freewheel hub according to the invention in a perspective illustration.

The present invention relates to a freewheel hub for a bicycle. A freewheel hub of this kind comprises a driver and a hub sleeve, which are each supported on a hub axle in such a way as to be rotatable about a common axis of rotation, a detent body arrangement comprising at least one detent body, which is supported in a radial detent body recess in such a way as to be displaceable between a locking position and a release position, and a preloading device, which is configured to preload the detent body towards the locking position.

In this case, the detent body recess is provided in a component comprising the driver and the hub sleeve, while the other component comprising the driver and the hub sleeve has a radial driving tooth system or is connected for conjoint rotation to the driving tooth system, wherein a surface of the detent body has a coupling surface, which rests against a contact surface of the detent body recess in the locking position, while an engagement portion of the detent body engages in the driving tooth system, such that, when the driver rotates in a first direction of rotation about the axis of rotation, torque is transmitted from the driver to the hub sleeve via the coupling surface, wherein, in the release position, the detent body does not engage in the driving tooth system and allows rotation of the hub sleeve relative to the driver in the first direction of rotation, thus enabling the hub sleeve to overtake the driver in the first direction of rotation.

As regards the arrangement of the driving tooth system and the detent body recess, there are therefore two alternatives. According to alternative one, the detent body recess is provided in the hub sleeve as the one component, and the driver as the other component has the driving tooth system or is connected for conjoint rotation to the driving tooth system. According to alternative two, the detent body recess is provided in the driver as the one component, and the hub sleeve as the other component has the driving tooth system or is connected for conjoint rotation to the driving tooth system.

Here, the term "for conjoint rotation" refers to a rotation about the common axis of rotation of the driver and the hub sleeve.

It is the object of the present invention to further develop the freewheel hub of the type in question in such a way that it can be adapted easily to different requirements in respect of the torque to be transmitted and, at the same time, is light, small and convenient.

According to the invention, it is envisaged that more than half of the coupling surface is designed as a planar region, via which force or torque can be transmitted in an effective manner from the driver to the hub sleeve.

The detent body arrangement can comprise a plurality of detent bodies, which are supported in respectively associated detent body recesses, e.g. two, three, four or six detent bodies, depending on the torque to be transmitted, which are preferably of identical design in order to simplify manufacture.

To the extent, therefore, that features "of the detent body" or "of the detent body recess" or "of the at least one detent body" or "of the at least one detent body arrangement" are described in this application, it will be understood that, in the case of a detent body arrangement that has a plurality of detent bodies, the respective features in each case preferably apply to a plurality of detent bodies, particularly preferably to all the detent bodies of the detent body arrangement and the associated detent body recesses, unless stated otherwise.

As a preferred option, the detent body recess is formed in the hub sleeve, while the driving tooth system is present on the driver. This has the advantage that the driving tooth system can be manufactured at low cost together with the cassette profile of the driver in a single production process.

The alternative basic construction with detent bodies supported in detent body recesses on the driver, which is likewise not excluded, is more expensive since in that case a specially produced high-strength ring, composed of steel for example, must be secured with the driving tooth system on the hub sleeve, which is generally manufactured from a lighter, less strong material, such as aluminum.

In a variant embodiment, the entire coupling surface can be of planar design, wherein the detent body is supported in the detent body recess in such a way that it can be displaced as a detent slide in a translational movement between the locking position and the release position.

This has the advantage that the force vector for rotational movement transmission acts almost exclusively tangentially and may have only a very small radial component. As a result, as in the case of axial freewheels, large forces can be transmitted with small dimensions, while the production costs are lower.

However, detent slides tend under certain circumstances to tilt in the detent body recess, and this demands high accuracy of the stop surfaces.

For more stable support, it is therefore possible, in an alternative variant embodiment, for the coupling surface of the detent body to be composed of the planar region and a curved region, in particular a cylindrical region, wherein the curved region serves for the rotatable support of the detent body as a detent pawl during its pivoting movement between the locking position and the release position. In particular, the cylindrical region can merge tangentially into the planar region. Here, this variant is also referred to below as a flat pawl and combines advantages of a slide-type detent mechanism, that is to say large engagement surfaces and the possibility of a predominantly tangential engagement angle with advantages of a pawl, that is to say stable support with less demanding requirements on the precision of pawl seating.

Tests have shown that, given suitable setting of the angle of inclination of those tooth flanks of the driving tooth system on a steel driver which are in the lead in the first direction of rotation, most applications manage with just two pawls in engagement in each case in a single tooth gap if the surfaces of the tooth flanks which are in the lead in the first direction of rotation are sufficiently large.

Particularly for interaction with a detent pawl whose engagement portion is formed by a single arm which engages only in a single tooth gap, it can be envisaged that for at least one tooth, preferably for a plurality or all of the teeth of the radial driving tooth system, provision can be made for a perpendicular to the tooth flank that is in the lead in the first direction of rotation, through a center of this tooth flank, not to intersect the tooth flank of the same tooth that is the trailing tooth flank in the first direction of rotation, something that reduces the risk that the teeth will shear off in operation.

There is also no intention to exclude exemplary embodiments in which the detent body arrangement comprises both detent slides and detent pawls.

The planar coupling surface can be designed to be so large that the surface pressure is greatly reduced. As a result, it is possible to reduce the number of pawls in the detent body arrangement and/or to use a less strong material for the detent bodies, e.g. AL 6082-T6 instead of the otherwise necessary AL 7075-T6.

In particular, provision can be made for the planar region of the coupling surface to amount to more than twice a tooth contact region of the surface of the detent body, preferably more than three times, particularly preferably more than five times, wherein the tooth contact region is that region of the surface of the detent body which is in surface contact in the locking position with the tooth flanks of the driving tooth system which are in the lead in the first direction of rotation.

For expedient transmission of the force or torque within the detent body, provision is preferably made for a perpendicular to the tooth contact region of the surface of the detent body through the center of the tooth contact region to intersect the planar region of the coupling surface of the detent body, particularly preferably in or close to the center of the planar region.

This is expedient particularly when the engagement portion of the detent body is formed by just a single arm, which is configured to engage in only one tooth gap of the driving tooth system.

For effective torque transmission, provision is preferably made for the planar region of the coupling surface to enclose an angle of no more than 30°, preferably of no more than 20°, even more preferably of no more than 10°, with the normal from the center of the planar region to the axis of rotation.

In this case, it is possible, in particular, for the detent body to have a constant cross-sectional shape perpendicular to a direction which is parallel to the axis of rotation of the freewheel hub in the assembled state, or it can at least be based on such a constant cross-sectional shape.

The spring mounting of the detent bodies can be accomplished by various variant embodiments of the preloading device, which can include an element or be formed by an element selected from a compression spring, a helical compression spring, a helical spring ring, a garter spring, a circlip, a rubber spring, a chemical-pulp spring, a sylomer spring or a combination thereof.

For each detent body, the preloading device can comprise a separate spring assigned to each detent body, e.g. a helical compression spring, in order to preload each individual detent body in a particularly targeted manner towards the locking position.

To reduce the number of components and simplify assembly, however, it is also alternatively possible to envisage that the preloading device comprises a spring which preloads a plurality of detent bodies towards the locking position, preferably a single spring for all the detent bodies of the detent body arrangement.

In the latter case, a preferred choice for detent slides is a garter spring ring, which preloads the detent slides radially inwards, while, for detent pawls, it is also possible to use a circlip, which acts on the pawls radially from the outside or radially from the inside in such a way that the pawls are each preloaded towards the locking position in a pivoting direction.

To facilitate assembly, the detent body arrangement, the preloading device and the component comprising the driver and the hub sleeve, in which the at least one detent body recess is provided, can be preassembled to form a first assembly, wherein the preloading device holds the detent body arrangement on the component, thus preventing the detent bodies from falling out of the associated detent body recesses. This first assembly can then be slipped onto the other component having the driving tooth system along the common axis of rotation, or can be inserted into the other component, depending on whether the driving tooth system faces radially outwards or inwards.

In an embodiment having a detent slide, this can be accomplished, for example, in that the at least one detent body recess tapers radially inwards, and the preloading device, e.g. a garter spring ring, preloads the at least one detent slide radially inwards and thus presses it into its seat in the recess in a captive manner.

For better distribution of the force introduced into the detent body or output from the latter, depending on whether the detent body recess is provided in the driver or in the hub sleeve, or in order to increase the overall force that can be transmitted, provision can be made for the engagement portion of the at least one detent body to have two or more arms, which are designed to engage in adjacent tooth gaps of the radial driving tooth system in the locking position.

This embodiment is preferred especially if the detent body is designed as a detent slide since in this way the tilting moment acting on the detent body can also be reduced and thus the support can be stabilized.

Moreover, precise engagement is easier to achieve with two or more arms in the case of slides than it is with pawls since, in the case of a purely translational movement, all the arms travel a path of the same length. The disadvantageous angle ratios of pawls moving in a rotational manner are eliminated, and high precision is not required.

Although detent pawls with more than one arm are possible in principle, they must be manufactured very precisely since, on account of the rotational engagement principle, the outer arm has to travel a longer distance in the same time and is therefore subject to a higher engagement velocity. In this case, both the seats and guides of the pawl and the engagement toothing and their dimensional tolerances must be very tight and manufactured with high precision.

As explained in the introduction, the detent body arrangement preferably has a plurality of detent bodies, preferably detent bodies of the same kind, and, in corresponding fashion, there is then a plurality of detent body recesses, which are distributed around the circumference of the component in which they are arranged, ensuring that the force or the torque of the driver is distributed between the detent bodies.

By the number of detent bodies and the number of teeth per detent body, it is possible to implement different applications in a modular fashion and to enable easy construction. For example, it is conceivable with the same hub sleeve to implement a racing bicycle hub with two detent bodies, an MTB hub with three detent bodies, and an eMTB hub or a cargo wheel hub with six detent bodies, in accordance with the respective torques of the specific application, in which case individual detent body recesses can remain empty, depending on the application. In this case, the detent bodies can be, in particular, detent slides with two teeth in each case.

According to a preferred exemplary embodiment, the detent body recesses are distributed in such a way that all the detent bodies can engage simultaneously in the driving tooth system, such that, when the driver rotates in the first direction of rotation, the force to be transmitted or the torque to be transmitted is distributed uniformly between all the detent bodies.

However, in order to reduce the maximum angle of rotation required before torque is also actually transmitted to the hub sleeve after the start of rotation of the driver in the first direction of rotation, provision can be made for the detent body arrangement to have a plurality of groups of detent bodies, which are supported in respective detent body recesses in a manner distributed around the circumference of one component in such a way that, in the case of each of the groups, the detent bodies of the respective group engage simultaneously in the driving tooth system in the locking position when said tooth system is in a suitable rotational position, while detent bodies of different groups cannot engage simultaneously in the driving tooth system.

For this purpose, provision can be made for the angular spacing of directly adjacent teeth of the driving tooth system to have a constant predetermined value and, in each group, the detent bodies of the respective group to have an angular spacing from one another which corresponds to an integral multiple of the predetermined value, while detent bodies of different groups have an angular spacing from one another which differs from an integral multiple of the predetermined value by a fraction of the predetermined value. If the detent body arrangement is formed by n groups, this fraction can be m/n, where m is a natural number that is greater than zero but less than n. In particular, the fraction can be ½ in the case of 2 groups, ⅓ and/or ⅔ in the case of 3 groups etc.

In addition, it should not be excluded that one group or even several or all of the groups are formed by a single detent body. Preferably, all the groups have the same number of detent bodies.

The applicant retains the right also to claim protection for a bicycle having a freewheel hub according to the invention.

Features of the various exemplary embodiments which are the same or correspond to one another are each provided with the same reference signs, and the additional exemplary embodiments are explained predominantly only to the extent that they differ from the first exemplary embodiment, to the description of which reference is otherwise made.

Figure 2:
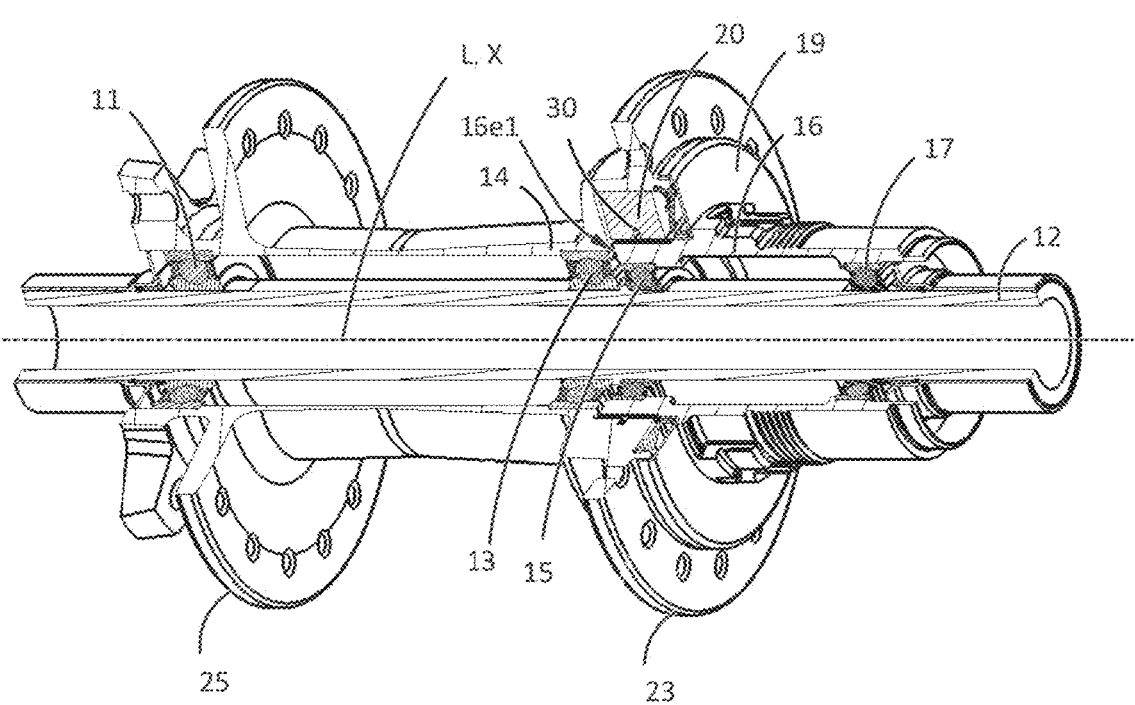
FIG. 2 is the subject matter of FIG. 1 in a three-quarter longitudinal section.

FIG. 1 shows a perspective illustration of a first exemplary embodiment of a freewheel hub 10 according to the invention, while FIG. 2 2 shows a three-quarter longitudinal section of the same hub.

Unless indicated otherwise, terms such as "axial" and "radial" in this application always refer to the longitudinal axis L of the freewheel hub 10, which coincides with the common axis of rotation X and, in the assembled state, with the rear wheel axis of the bicycle.

The freewheel hub 10 comprises a hub axle 12, which can be fixed on the frame of a bicycle in a known manner. A hub sleeve 14 is supported on the hub axle 12 via two rolling bearings 11 and 13, and a driver 16 is supported on the said axle via two further rolling bearings 15 and 17, both being supported in such a way that they can rotate about the common axis of rotation X.

The driver 16 can be connected in a conventional manner to a pinion arrangement (not illustrated here), via which torque can be introduced into the driver 16, while the hub sleeve 14 has two spoke flanges 23, 25 for connection to the spokes (likewise not illustrated) of a rear wheel.

A longitudinal end 16e1 of the driver 16 which is adjacent to the hub sleeve 14 is inserted into the hub sleeve 14. In the axial region of the hub in which the hub sleeve 14 and the driver 16 overlap one another there is a detent body arrangement 18 in the interior of the freewheel hub 10, of which one detent body 20 can be seen in the sectional illustration in FIG. 2.

A cover ring 19 prevents dirt and/or moisture from penetrating into the radial gap between the driver 16 and the hub sleeve 14.

Figure 3:
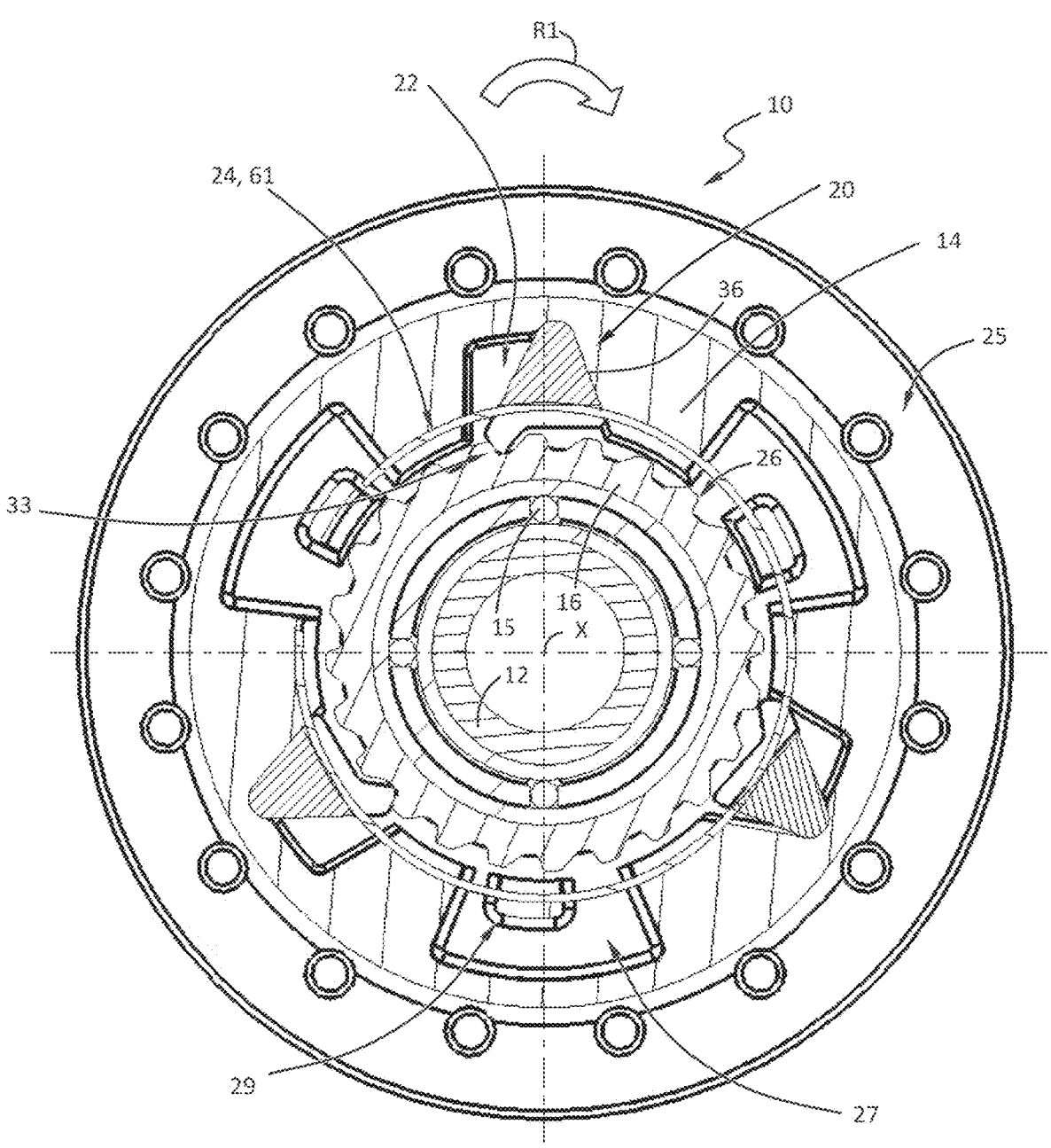
FIG. 3 is the subject matter of FIG. 1 in a cross-sectional view in a section plane perpendicular to the axis of rotation, which is indicated in FIG. 1 and denoted by III-III.

As can be ascertained best from the cross-sectional view in FIG. 3, the hub sleeve 14 in the present case has three radial detent body recesses 22 distributed around the circumference of the hub sleeve 14 in order to support the detent bodies 20.

Three further recesses 27, each having a bearing projection 29 arranged therein, are provided in the hub sleeve 14, between the detent body recesses in the circumferential direction, for the sake of reducing weight.

The detent bodies 20, which are here designed as detent pawls 50, are each supported in the associated detent body recesses 22 in such a way that they can pivot between a locking position and a release position, and they are each held in the hub sleeve 14 in a manner preloaded towards the locking position by a circlip 61 as a preloading device 24.

In the example illustrated, those of the three detent pawls 50 which are in the 12 o'clock position and in the 8 o'clock position in FIG. 3 are in the locking position, in which an engagement portion 33 of the respective detent pawl 50 engages in the radial driving tooth system 26, which is provided on the outer circumference of the driver 16, at the longitudinal end 16e1 thereof, while, on account of its angular position relative to the driver 16, the detent pawl which is in the 4 o'clock position in FIG. 3 is in the release position, in which the detent pawl 50 is not in engagement with the driving tooth system 26. In the present case, this serves primarily to illustrate the locking position and the release position in the same figure.

Though not illustrated, the three detent body recesses 22 could preferably also be arranged in such a way that all the detent bodies are always simultaneously in the locking position or the release position.

Figures 4, 5:
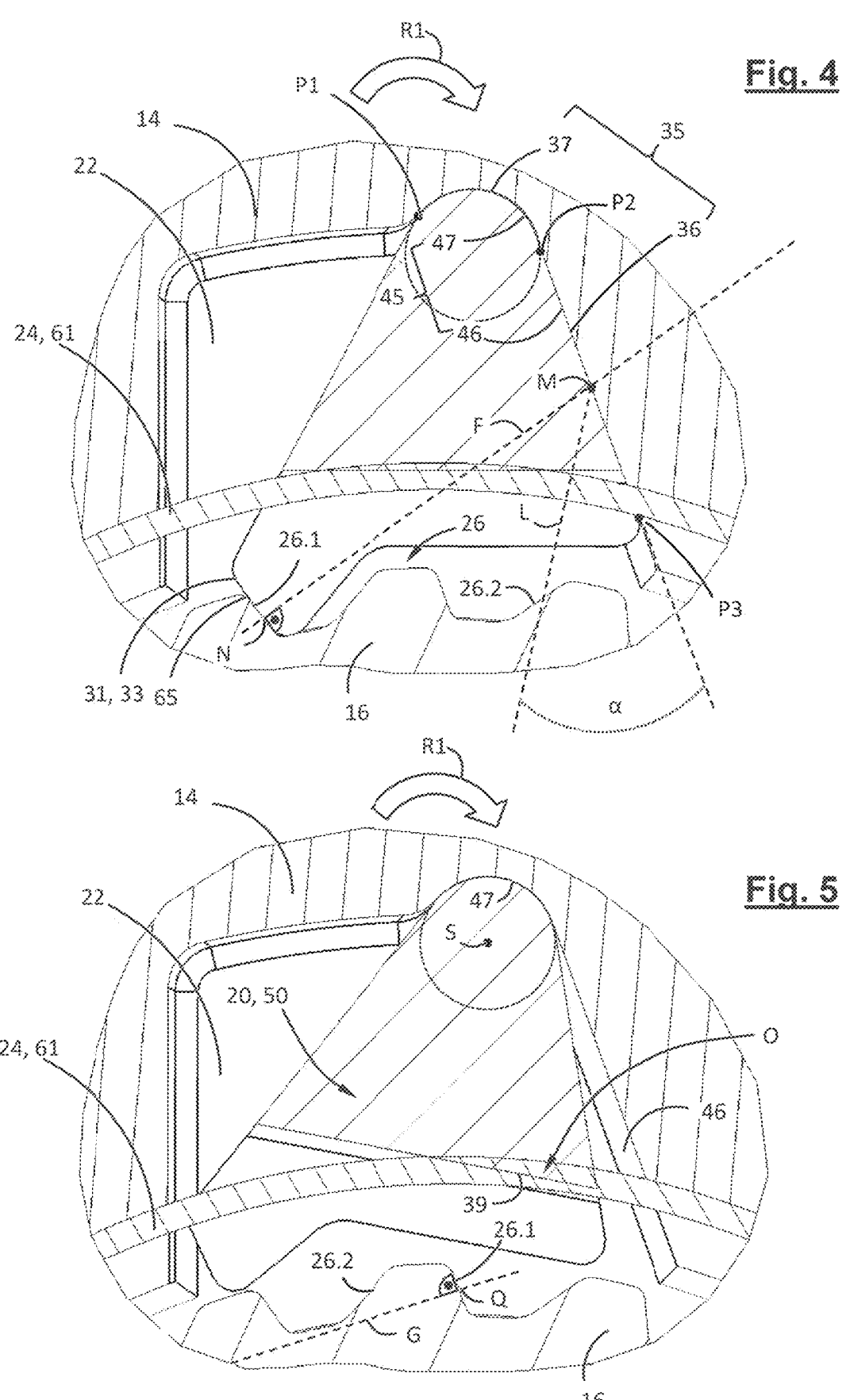
FIG. 4 is an enlarged detail of FIG. 3 with a detent pawl designed as a flat pawl in the locking position.
FIG. 5 is an enlarged detail of FIG. 3 with a detent pawl designed as a flat pawl in the release position.

Enlarged details of FIG. 3 are illustrated in FIGS. 4 and 5, where FIG. 4 shows the detent body 20 in the locking position, and FIG. 5 shows the detent body 20 in the release position.

Here, the section plane of the views in FIGS. 3 to 5 is chosen so that it passes centrally through the grooves 30 in the detent bodies 20, in which the circlip 61 is accommodated.

When the driver 16 is rotated in the first direction of rotation R1, torque is transmitted from the driver 16 to the hub sleeve 14 and hence to the rear wheel of the bicycle via those detent pawls 50 which are in the locking position.

However, the hub sleeve 14 can overtake the driver 16 in the first direction of rotation R1, this corresponding to rotation of the hub sleeve 14 relative to the driver 16 in the first direction of rotation R1 or rotation of the driver 16 relative to the hub sleeve 14 counter to the first direction of rotation R1 since, in the case of such a movement, the engagement portions 33 of the detent pawls 50 can slide over the shallower tooth flanks 26.2 of the driving tooth system 26, which are the trailing flanks in the first direction of rotation R1, or the detent pawls 50 are repeatedly pivoted into the release position by the tooth flanks 26.2 during the rotation.

As can be seen best in FIG. 4, the detent body 20 rests part of its surface, which is here referred to as the coupling surface 35, against a corresponding contact surface 45 of the recess 22 in the locking position, wherein the coupling surface 35 in the example illustrated is composed of a region 37 with a convex cylindrical curvature, which serves for the pivotable support of the detent body 20, and of a planar region 36, which serves for the transmission of torque to the hub sleeve 14 during the rotation of the driver 16 in the first direction of rotation R1. In corresponding fashion, the contact surface 45 of the detent body recess 22 is composed of a bearing region 47 with a concave cylindrical curvature and of a planar region 46.

In the cross-sectional view in FIG. 4, the curved region 37 extends between the indicated points P1 and P2, and the planar region extends between points P2 and P3.

The size and inclination of the planar region 36 are selected with regard to effective transmission of torque with, at the same time, stable support for the detent body 20. According to the invention, the planar region 36 accounts for more than half of the coupling surface 35.

The angle α between the planar region 36 and the normal L from the center M of the planar region 36 to the axis of rotation X is preferably no more than 30°, thus enabling the tangential component of the force introduced to be transmitted in an effective manner.

In the example illustrated in FIG. 4, the planar region 36 of the coupling surface 35 accounts for more than five times the tooth contact region 65, that is to say the region of the surface of the detent body 20 which is in surface contact in the locking position with the tooth flank 26.1 of the radial driving tooth system 26 which is in the lead in the first direction of rotation R1.

For advantageous force transmission, a perpendicular F to the tooth contact region 65, through the center N of the tooth contact region 65, furthermore intersects the planar region 36 of the coupling surface 35 of the detent body 20 in the example illustrated, preferably in or close to the center M of the planar region 36.

For technical reasons, it is not possible when drafting the figures to represent a deformation of the circlip 61 by the detent body 20, but it is possible to infer the deformation of the circlip 61 and the resulting forces from the overlapping regions of the circlip 61 and the detent body 20 in FIGS. 4 and 5.

Thus, the only minimal overlap in FIG. 4 shows that the preloading device 24 is largely relaxed in the locking position of the detent body 20 and presses the detent body 20 only slightly radially outwards into the concavely cylindrically curved bearing region 47 of the detent body recess 22 and in this way holds the detent body against the hub sleeve 14.

If, starting from the position in FIG. 4, the hub sleeve 14 overtakes the driver 16 in the first direction of rotation R1, the detent pawl 50 is pivoted clockwise by the tooth flank 26.2 out of the locking position into the release position, which is illustrated in FIG. 5. In this case, the position of the pivoting axis S of the displacement movement of the detent pawl 50 between the locking position and the release position is defined by the cylindrically curved bearing region 47 of the detent body recess 22, as indicated in FIG. 5.

The significantly larger overlap region O, visible in FIG. 5, between the circlip 61 and the detent body 20 shows that the circlip 61 is deformed by the detent body 20 in such a way that it presses on a base 39 of the groove 30 in the right-hand region of the detent body 20 in FIG. 5 and thus preloads the detent body 20 to perform an anticlockwise pivoting movement back into the locking position.

It is furthermore evident from FIG. 5 that, in the example illustrated, the tooth height and the inclination of those tooth flanks 26.1 of the radial driving tooth system 26 of the driver 16 which are in the lead in the first direction of rotation R1 are chosen in such a way that a perpendicular G to a tooth flank 26.1 which is in the lead in the first direction of rotation, through a center Q of this tooth flank 26.1, does not intersect the tooth flank 26.2 of the same tooth which is the trailing tooth flank in the first direction of rotation R1, something that reduces the risk that the teeth will be sheared off in operation.

In the case of a detent body which has more than one arm 31, on the other hand, the tooth flank 26.1 which is in the lead in the first direction of rotation can be steeper, or the tooth height can be lower, since in this case the force acting on the driving tooth system in operation is distributed between the various arms.

Figures 6, 7:
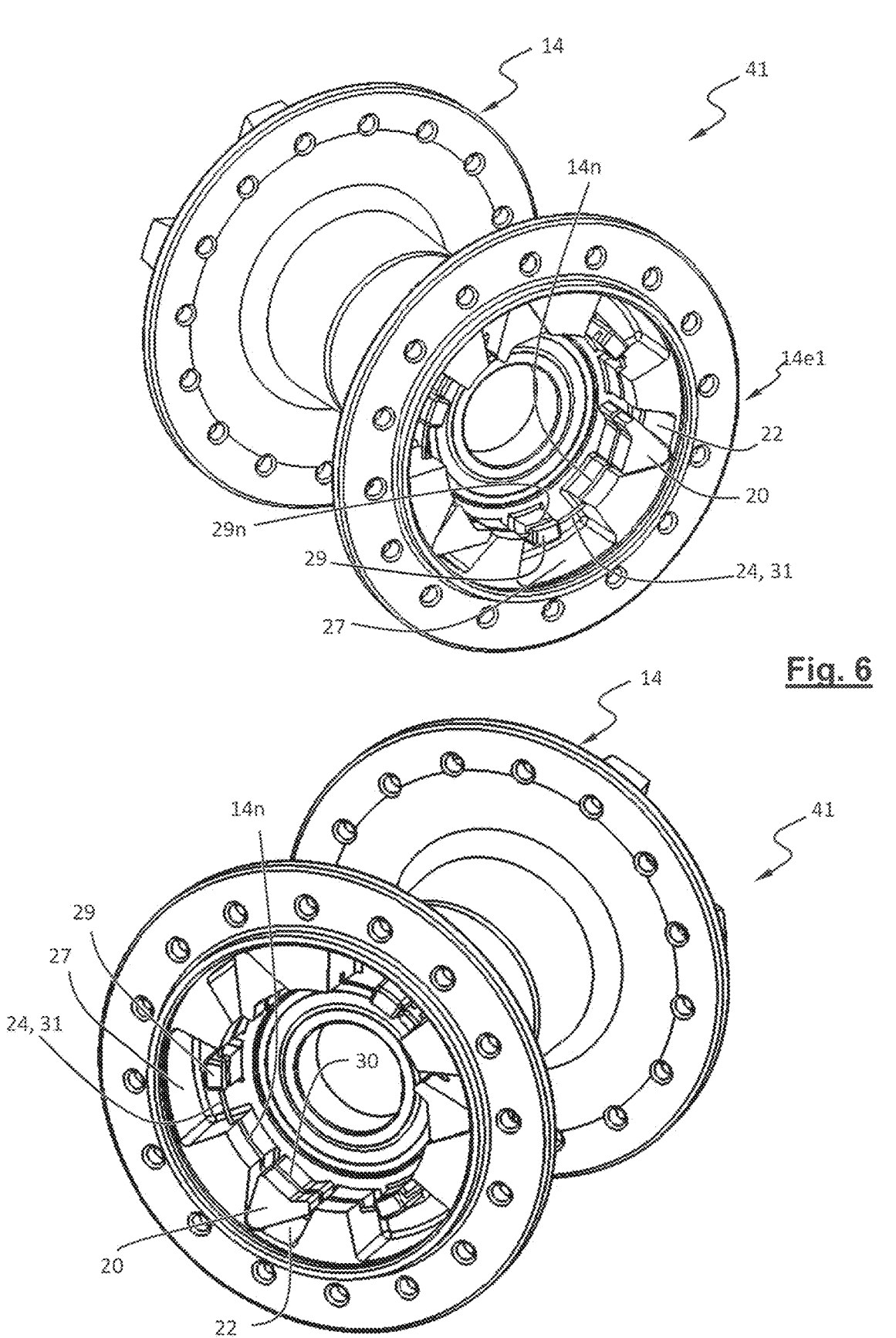
FIG. 6 is the subject matter of FIG. 1 in a different view, where the hub axle and the driver are omitted.
FIG. 7 is the subject matter of FIG. 1 in a different view, where the hub axle and the driver are omitted.

Since the circlip 61 holds the detent body arrangement 18 against the hub sleeve 14 and prevents the detent bodies 20 from falling out of the detent body recesses 22, the above-mentioned components can be preassembled to form a first assembly 41, which is illustrated from different angles of view in FIGS. 6 and 7. In these views, it can be seen that the hub sleeve 14 has grooves 14n and 29n to receive and guide the circlip 61, both in the region between the individual recesses 22, 27 and in the region of the bearing projections 29.

Furthermore, these figures show that the recesses 22, 27 are open not only radially inwards but also axially at the longitudinal end 14el of the hub sleeve 14 which is adjacent to the driver 16 in the assembled state, but they are covered by the cover 19 in the fully assembled state (FIG. 1).

Figure 8:
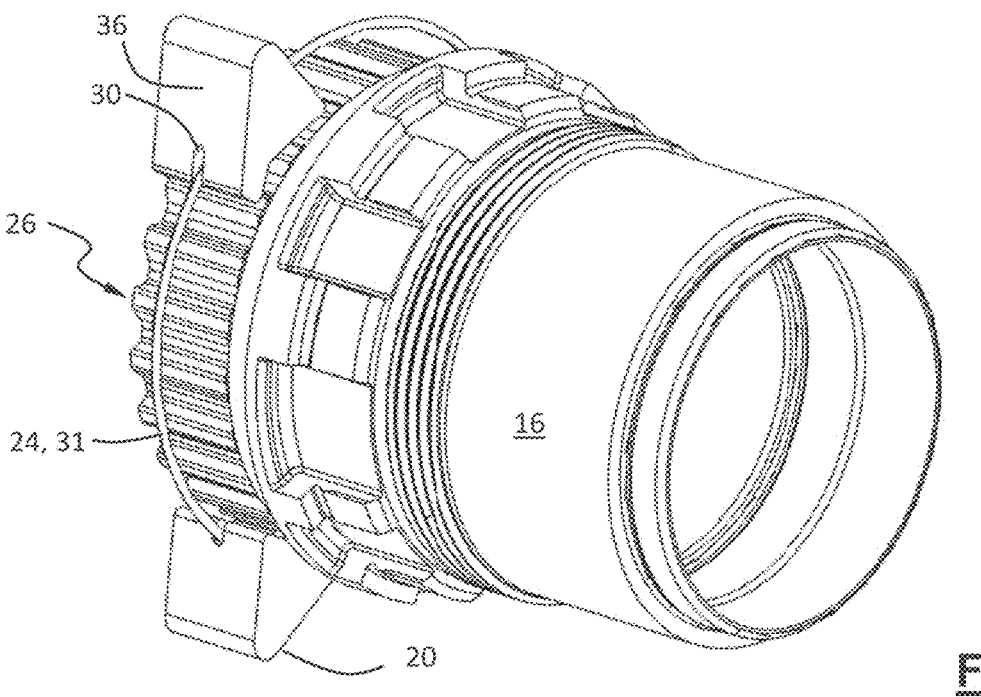
FIG. 8 is the subject matter of FIG. 1 in a different view, where the hub axle and the hub sleeve are omitted.
Figure 9:
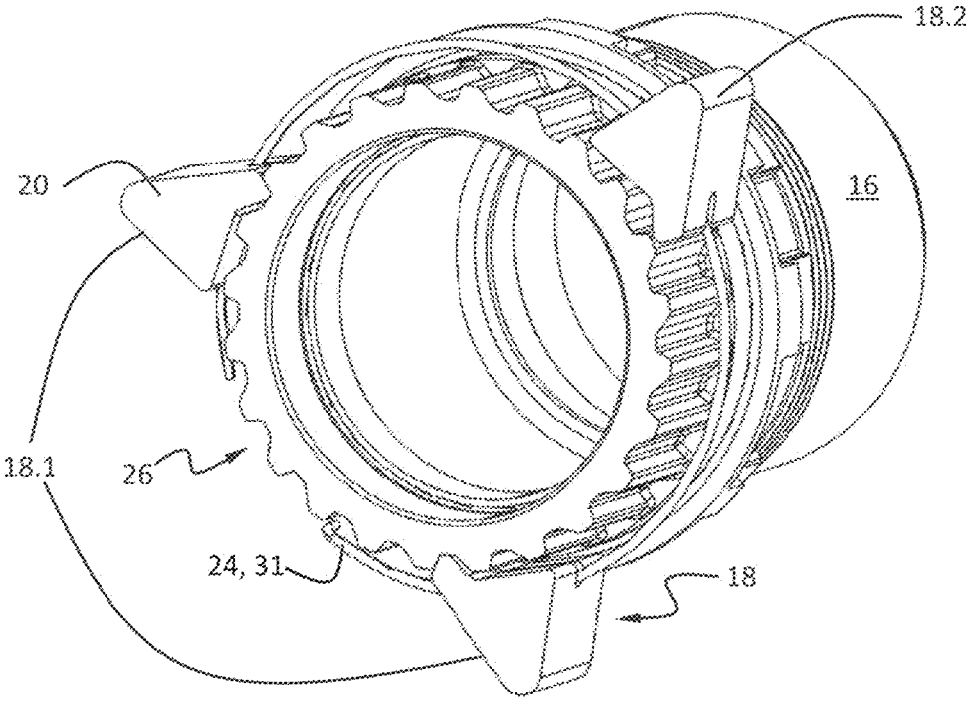
FIG. 9 is the subject matter of FIG. 1 in a different view, where the hub axle and the hub sleeve are omitted.

FIGS. 8 and 9 show the freewheel hub of the first exemplary embodiment from different angles of view with the hub axle and the hub sleeve omitted.

As these figures show, the detent bodies 20 can be assigned to two different groups 18.1 and 18.2 here, wherein group 18.1 has two detent bodies and group 18.2 has just one detent body.

The detent bodies 20 are arranged in a manner distributed in such a way that, for each of the two groups, all the detent bodies of the respective group engage simultaneously in the driving tooth system when said tooth system is in a suitable rotational position, while detent bodies of different groups cannot engage simultaneously in the driving tooth system.

For a driving tooth system 26 with a predetermined number of teeth, it is thereby possible to shorten the maximum time required before torque is transmitted to the hub sleeve 14 after the start of a rotation of the driver 16 in the first direction of rotation R1.

In practice, however, it is preferred in this case that all the groups have the same number of detent bodies, e.g. one, two or three detent bodies, while, in the present case, the various groups primarily serve to illustrate the locking and the release position in a single sectional view.

Figures 10, 11, 12:
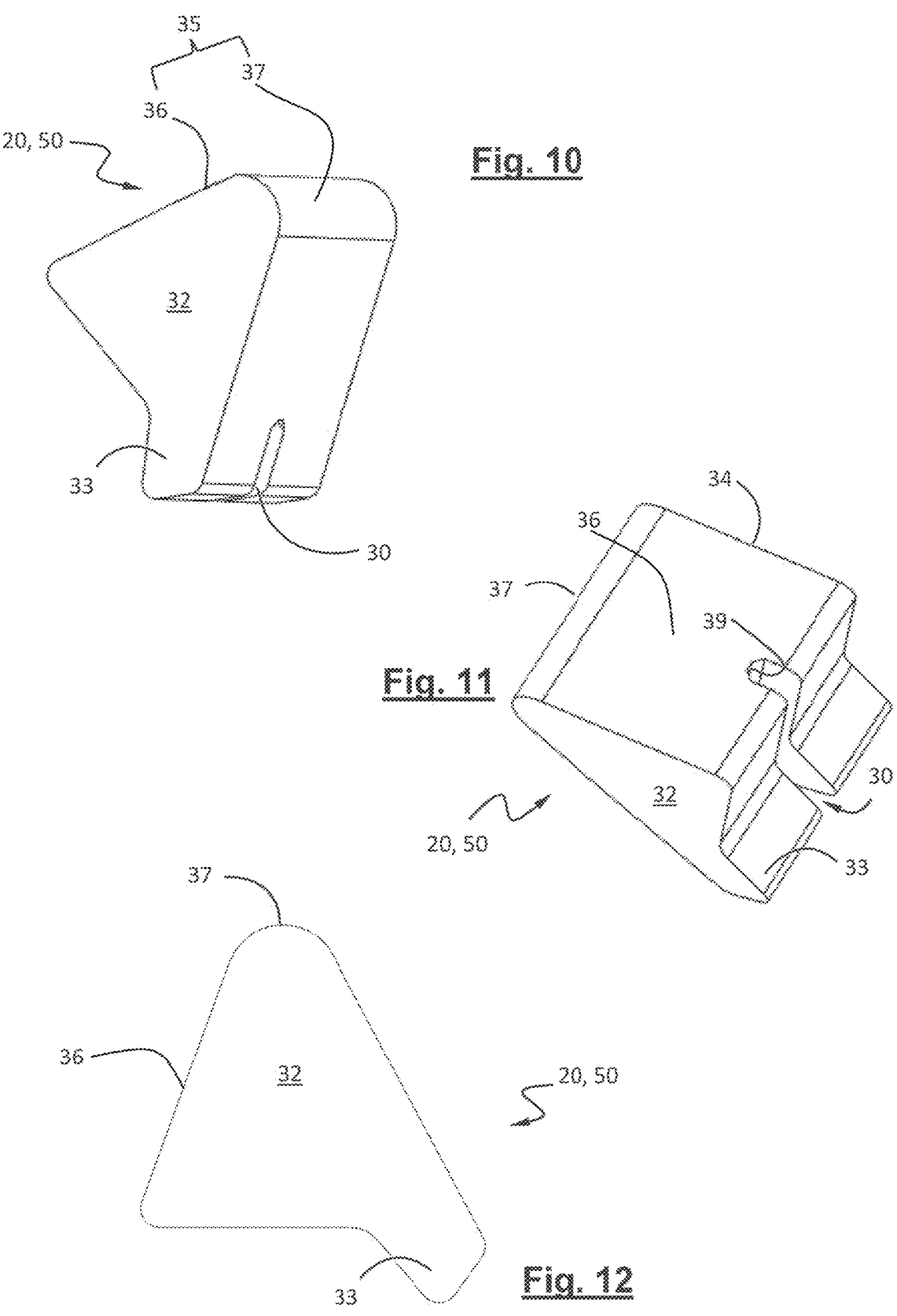
FIG. 10 shows a different view of one of the detent pawls of the freewheel hub from FIG. 1.
FIG. 11 shows a different view of one of the detent pawls of the freewheel hub from FIG. 1.
FIG. 12 shows a different view of one of the detent pawls of the freewheel hub from FIG. 1.

Finally, one of the detent bodies 20 of the first exemplary embodiment which is designed as a "flat pawl" is illustrated once again separately and from different angles of view in FIGS. 10 to 12.

As the figures show, the detent body 20 has two flat parallel side walls 32, 34 and, apart from the groove 30, has the same cross-sectional shape in all the section planes parallel to the side walls 32, 34.

In the view of the side wall 32 which is shown in FIG. 12, the detent body 20 has the basic shape of a virtually isosceles triangle rounded at the tip, wherein the engagement portion 33 projects from this basic shape as an extension of one of the sides of the triangle.

In comparison with conventional pawls, on which the engagement portion is directly adjoined by a substantially cylindrical bearing portion, the detent body according to the invention has a coupling surface with a large flat region 36 for more effective torque transmission, resulting in the designation "flat pawl" proposed here.

FIGS. 13 to 17 illustrate further exemplary embodiments of the invention.

FIGS. 13 and 14 correspond in their views approximately to FIGS. 4 and 5. Each show an enlarged cross-sectional view of the detent body in the locking position and the release position and illustrate a variant embodiment in which each detent pawl 50 is preloaded towards the locking position by a separate helical compression spring 42. In this case, therefore, the preloading device 24 is formed by all the helical compression springs 42.

Here, as a departure from the first exemplary embodiment, the shape of the detent pawls 50 and of the detent pawl recesses is configured in such a way that there are two possibilities for positioning the springs, namely either in a first spring receptacle 43 or in a second spring receptacle 53, which are formed at different locations in the detent body recess 22.

In corresponding fashion, the detent body 20 has two pressure surfaces 44, 54, on which, depending on the choice of spring receptacle 43, 53, pressure is exerted by the correspondingly positioned helical spring in the release position of the detent body 20 in order to preload the detent body towards the locking position.

Figure 17:
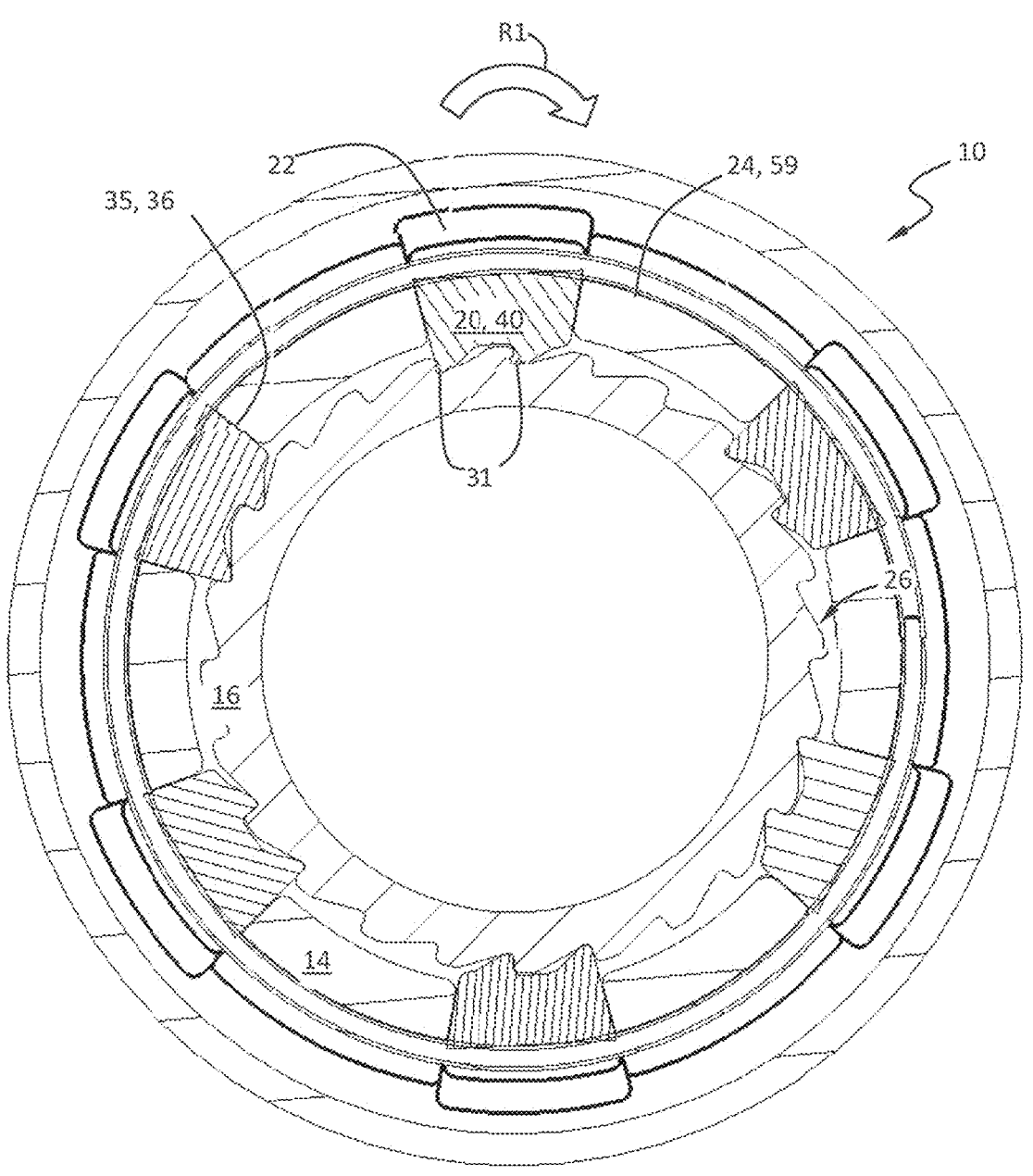
FIG. 17 shows a cross-sectional view of a fourth exemplary embodiment of a freewheel hub according to the invention having detent slides.

In the third and fourth exemplary embodiments in FIGS. 15 to 17, in contrast to the first two exemplary embodiments, the detent bodies 20 are not designed as detent pawls but as detent slides 40.

FIGS. 15 and 16 correspond once again to the views in FIGS. 4 and 5 for a third exemplary embodiment of the invention. In a manner similar to the second exemplary embodiment, a helical compression spring is provided for each detent body 20, the said spring pressing on a pressure surface 51 of recessed design in the release position (FIG. 16) of the detent body in order to preload the detent body 20 towards the locking position (FIG. 15), although, in contrast to the second exemplary embodiment, the displacement movement is a translational movement.

In the case of the detent slide solutions in FIGS. 15 to 17, the entire coupling surface 35 of each detent body 20 is of planar design and is thus identical to the planar region 36.

In contrast to the previous exemplary embodiments, the engagement portion 33 of the detent slide 40 illustrated there has not only one but two engagement arms 31, which engage in adjacent tooth gaps 27 of the driving tooth system 26, ensuring that the force transmitted to the detent body 20 in the locking position by the driver 16 as the latter rotates in the first direction of rotation R1 is distributed between the two contact surfaces of the engagement arms 31.

In the example in FIGS. 15 and 16, the translational movement of the detent slides 40 during the movement between the locking position and the release position is not completely radial but is slightly inclined, corresponding to the inclination of the steeper tooth flanks 26.1 of the driving tooth system 26, and the movement is guided by two substantially parallel side walls 22s of the detent body recess 22.

To ensure that the detent slides 40 do not fall radially inwards out of the detent body recesses 22 during assembly, a retaining projection 52 is preferably provided on the radially inner edge of the detent slide recess 22, the leading edge in the direction of rotation R1, wherein the insertion of the detent slides 40 can in this case be facilitated by an additional insertion recess 55 provided on the radially inner edge of the detent slide recess 22, the trailing edge in the direction of rotation R1.

In the exemplary embodiment in FIG. 17, six detent slides 40, each with two engagement arms 31, are provided and, in contrast to the example in FIGS. 15 and 16, these are jointly preloaded radially inwards towards the locking position by a single garter spring 59 as a preloading device. In this example, the detent body recesses 22 taper radially inwards slightly, with the result that the preloading device 24 holds the detent bodies 20 against the hub sleeve 14 in this example too.

It should be added that the detent body recesses are provided on a component consisting of a driver and a hub sleeve, namely on the hub sleeve in all the exemplary embodiments illustrated here, while the driving tooth system is provided on the respective other component consisting of the driver and the hub sleeve, namely on the driver in all the exemplary embodiments illustrated. However, a reverse arrangement would also be conceivable.

The freewheel hub proposed according to the invention is light, small and convenient, and it can be adapted very easily to different requirements. In particular, the novel flat pawls described here make it possible to combine some of the advantages of detent slides with those of conventional rotary detent pawls.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A freewheel hub for a bicycle, comprising:
   a driver and a hub sleeve, which are each supported on a hub axle in such a way as to be rotatable about a common axis of rotation,
   a detent body arrangement comprising at least one detent body, which is supported in a radial detent body recess in such a way as to be displaceable between a locking position and a release position, and
   a preloading device, which is configured to preload the detent body towards the locking position,
   wherein the detent body recess is provided in a component comprising one of the driver or the hub sleeve, while the other component comprising the driver or the hub sleeve has a radial driving tooth system or is connected for conjoint rotation to the driving tooth system,
   wherein the surface of the detent body has a coupling surface, which rests against a contact surface of the detent body recess in the locking position, while an engagement portion of the detent body engages in the driving tooth system, such that, when the driver rotates in a first direction of rotation about the axis of rotation, torque is transmitted from the driver to the hub sleeve via the coupling surface, and wherein, in the release position, the detent body allows rotation of the hub sleeve relative to the driver in the first direction of rotation,
   wherein more than half of the coupling surface is designed as a planar region, and
   wherein the planar region of the coupling surface encloses an angle of no more than 30° with the normal from the centre of the planar region to the axis of rotation.

2. The freewheel hub according to claim 1,
   wherein the entire coupling surface is of planar design, and the detent body can be displaced as a detent slide in a translational movement between the locking position and the release position.

3. The freewheel hub according to claim 1,
   wherein the coupling surface is composed of the planar region and a curved region wherein the curved region serves for a rotatable support of the detent body as a detent pawl during its pivoting movement between the locking position and the release position.

4. The freewheel hub according to claim 1,
   wherein the preloading device comprises a spring, which is configured to preload a plurality of detent bodies of the detent body arrangement towards the respective locking position.

5. The freewheel hub according to claim 4, wherein the detent body arrangement, the preloading device and the component comprising the driver or the hub sleeve on which the at least one detent body recess is provided can be preassembled to form a first assembly, wherein the preloading device holds the detent body arrangement on the component.

6. The freewheel hub according to claim 5, wherein the detent body is designed as a detent slide which can be displaced between the release position and the locking position in a translational movement, and wherein the detent body recess tapers radially inwards, and the preloading device preloads the detent slide radially inwards.

7. The freewheel hub according to claim 1, wherein the engagement portion of the detent body has two or more arms, which are designed to engage in adjacent tooth gaps of the driving tooth system in the locking position.

8. The freewheel hub according to claim 1, wherein the detent body arrangement has a plurality of groups of detent bodies, which are supported in respective detent body recesses in a manner distributed around the circumference of one component in such a way that, in the case of each of the groups, the detent bodies of the respective group engage simultaneously in the driving tooth system in the locking position when said tooth system is in a suitable rotational position, while detent bodies of different groups cannot engage simultaneously in the driving tooth system.

9. The freewheel hub according to claim 1, characterized in that the planar region of the coupling surface amounts to more than twice a tooth contact region of the surface of the detent body, wherein the tooth contact region is that region of the surface of the detent body which is in surface contact in the locking position with the tooth flanks of the driving tooth system which are in the lead in the first direction of rotation.

10. The freewheel hub according to claim 9, characterized in that a perpendicular to the tooth contact region through the center of the tooth contact region intersects the planar region of the coupling surface at the center of the planar region.

11. The freewheel hub according to claim 1, wherein the planar region of the coupling surface is configured to transmit torque to the hub sleeve.

12. A freewheel hub for a bicycle, comprising:
   a driver and a hub sleeve, which are each supported on a hub axle in such a way as to be rotatable about a common axis of rotation,
   a detent body arrangement comprising at least one detent body, which is supported in a radial detent body recess in such a way as to be displaceable between a locking position and a release position, and
   a preloading device, which is configured to preload the detent body towards the locking position,
   wherein the detent body recess is provided in a component comprising one of the driver or the hub sleeve, while the other component comprising the driver or the hub sleeve has a radial driving tooth system or is connected for conjoint rotation to the driving tooth system,
   wherein the surface of the detent body has a coupling surface, which rests against a contact surface of the detent body recess in the locking position, while an engagement portion of the detent body engages in the driving tooth system, such that, when the driver rotates in a first direction of rotation about the axis of rotation, torque is transmitted from the driver to the hub sleeve via the coupling surface, and wherein, in the release position, the detent body allows rotation of the hub sleeve relative to the driver in the first direction of rotation,
   wherein more than half of the coupling surface is designed as a planar region, and
   wherein the planar region of the coupling surface encloses an angle of no more than 30° with the normal from the centre of the planar region to the axis of rotation, and
   wherein the coupling surface is composed of the planar region and a curved region wherein the curved region serves for a rotatable support of the detent body as a detent pawl during its pivoting movement between the locking position and the release position.

* * * * *